Dec. 5, 1961  W. B. ROSENFIELD  3,012,132
LONG SINGLE-LINE FLUORESCENT LIGHT FIXTURE
Filed Sept. 11, 1958  5 Sheets-Sheet 1

INVENTOR
WILLIAM B. ROSENFIELD
BY
ATTORNEY

Dec. 5, 1961 W. B. ROSENFIELD 3,012,132
LONG SINGLE-LINE FLUORESCENT LIGHT FIXTURE
Filed Sept. 11, 1958 5 Sheets-Sheet 2
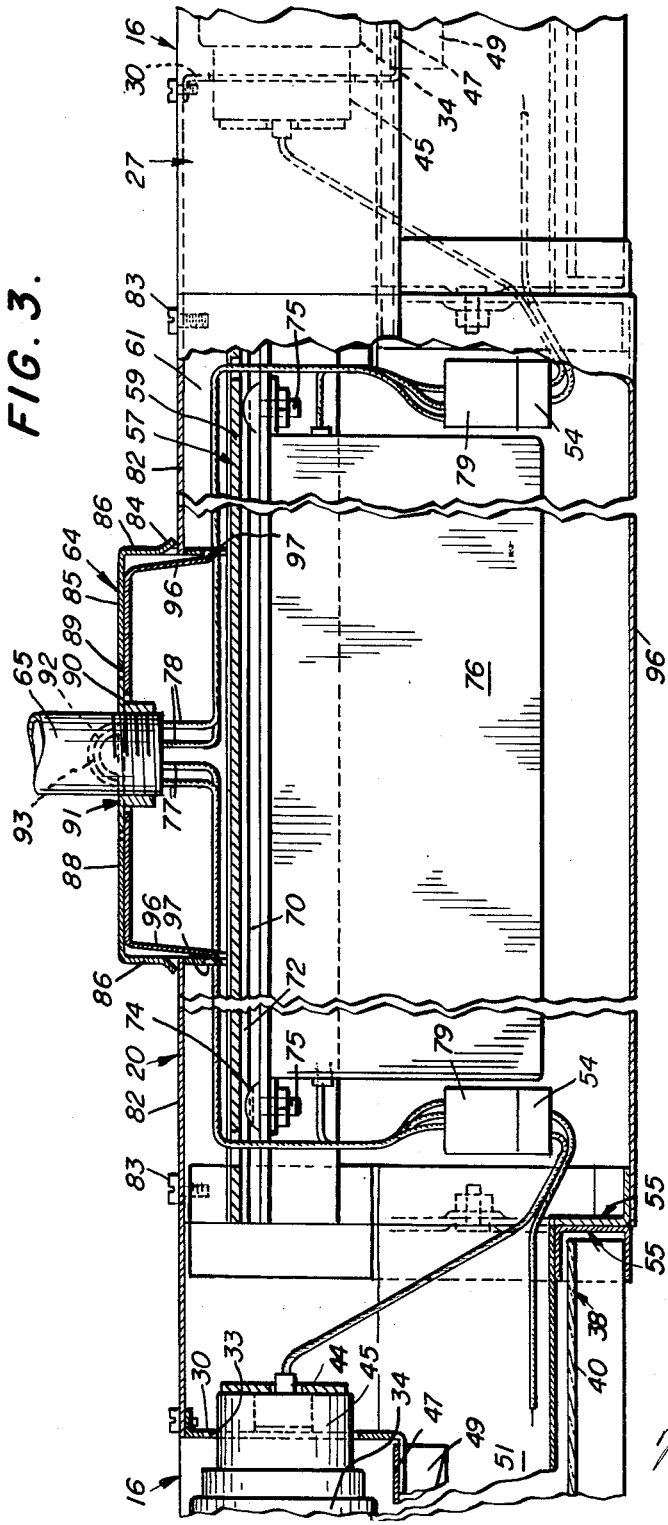
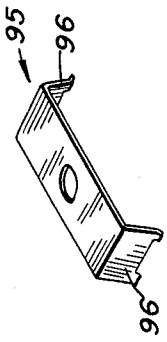
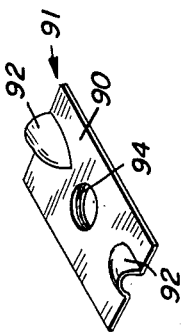
INVENTOR
WILLIAM B. ROSENFIELD
BY
ATTORNEY

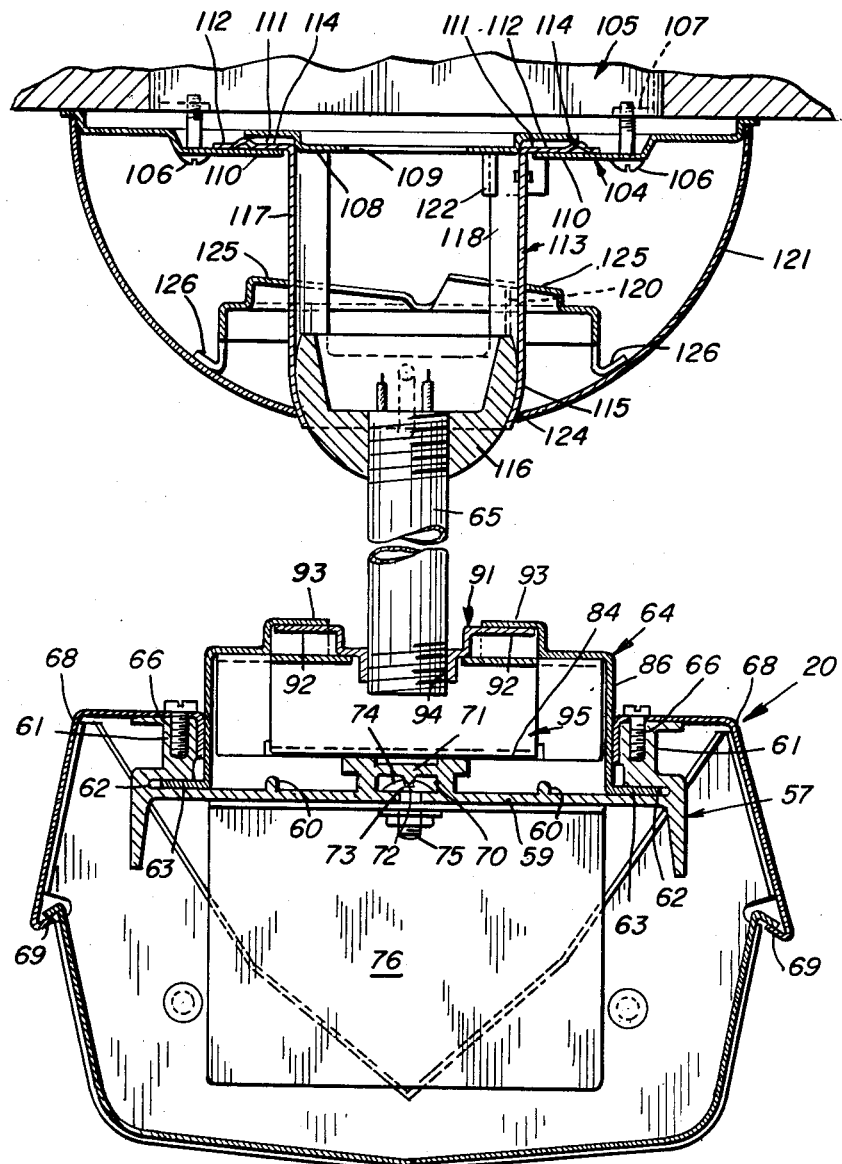

Dec. 5, 1961 W. B. ROSENFIELD 3,012,132
LONG SINGLE-LINE FLUORESCENT LIGHT FIXTURE
Filed Sept. 11, 1958 5 Sheets-Sheet 4

INVENTOR
WILLIAM B. ROSENFIELD
BY
ATTORNEY

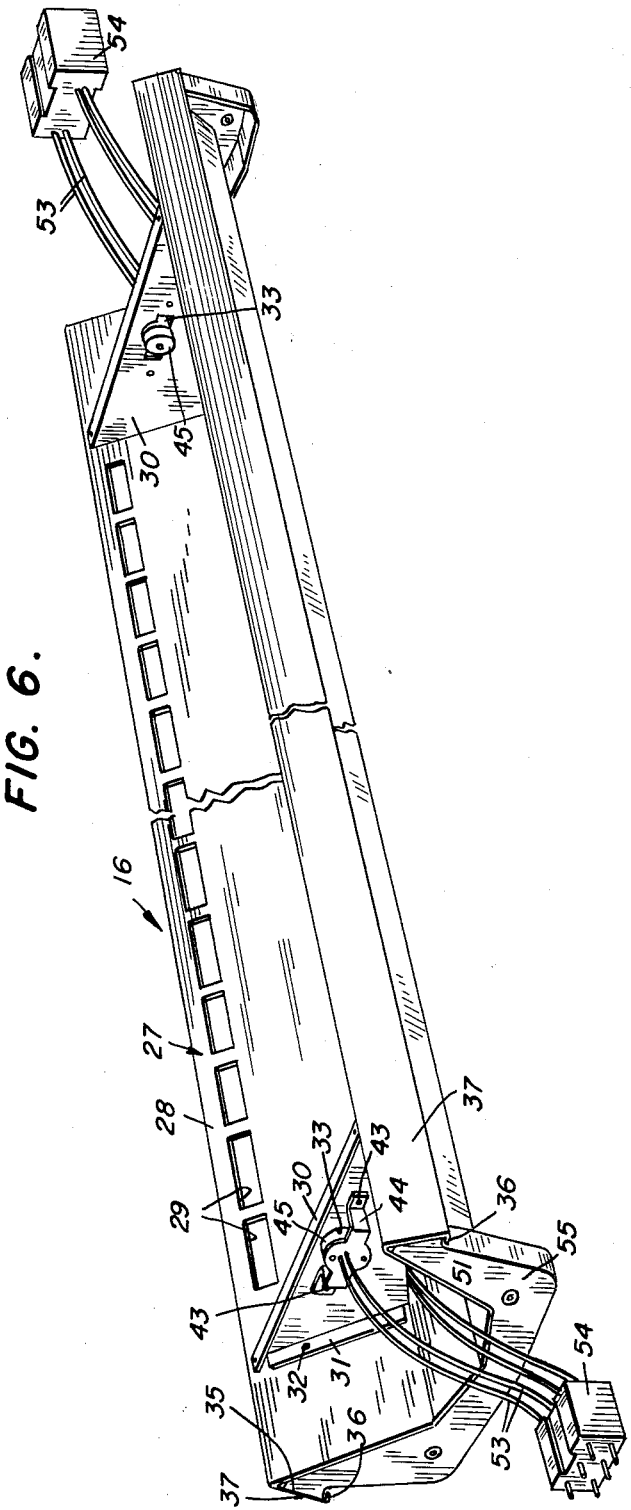

United States Patent Office 3,012,132
Patented Dec. 5, 1961

3,012,132
LONG SINGLE-LINE FLUORESCENT LIGHT
FIXTURE
William B. Rosenfield, Sepulveda, Calif., assignor to Sunbeam Lighting Company, Los Angeles, Calif., a firm
Filed Sept. 11, 1958, Ser. No. 760,435
2 Claims. (Cl. 240—9)

This invention relates to a long single-line fluorescent light fixture assembly.

One object of the invention is to provide means for the simple mechanical and electrical installation and connection of a long line of ceiling fluorescent lamp housing units with alternate intermediate coupler-ballast-suspension units and coupler-suspension units. Another object is to provide a combined suspension support ballast housing and coupler unit for mechanically joining long lines of end-to-end fluorescent light fixtures, which includes easily connected and disconnected pin and socket block means for electrically connecting the supply lines and the ballast to the lamps. A further object is to provide fully wired separate light housing units, and coupler-suspension units with and without ballast members, thereby facilitating installation and assembly piece by piece on the ceiling, with a minimum requirement for skilled installation labor.

These and other objects are attained by my invention which will be understood from the following description, reference being made to the accompanying drawings in which:

FIG. 3 is a longitudinal cross-sectional view partly in elevation taken on the line 3—3 of FIG. 1;

FIG. 4 is a vertical transverse cross-sectional view taken on the line 4—4 of FIG. 1;

FIG. 6 is a perspective view of a typical fluorescent tube housing unit;

FIG. 8 is a perspective view of the trunion member for the stem attachment to the coupler-suspension units; and FIG. 9 is a perspective view of the spring member for the trunion of FIG. 8.

Figure 1:
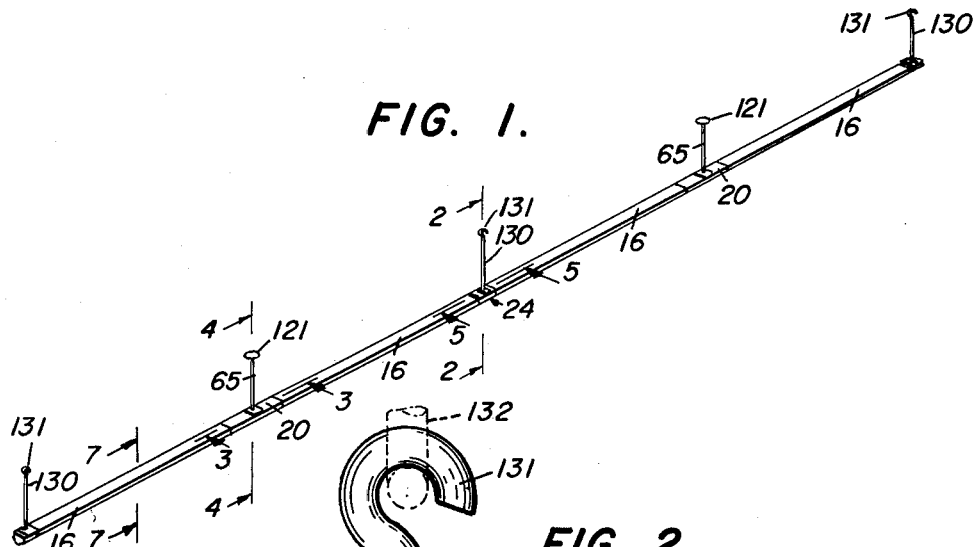
FIG. 1 is a schematic representation of a long single-line fixture assembly as mounted on a ceiling.

Referring particularly to FIG. 1, this shows one of numerous possible arrangements of units which may be assembled from the units herein described. The particular one shown consists of a long line of lighting members in which light housing units are joined together by coupler units, first with a coupler-suspension-unit and then with a coupler-ballast-suspension unit. It will be clear that other arrangements of the several units may be made.

The fluorescent tube housing units 16 are generally of long trough-like structure having end plates which may be joined to the end plates of other light units or to the suspension support unit sides, as will be described. As shown, the particular tube housing units consist of reflecting type fixtures, as set forth in detail in Bodian and Rosenfield patent application, Ser. No. 720,100, filed March 10, 1958, now Patent No. 2,990,470, issued June 27, 1961. The housing consists generally of a V-shaped channel 27 directed toward the ceiling, the side channel walls 28, in their upper portions being provided with a plurality of window slots 29 through which a relatively small proportion of the light generated by the elongated fluorescent lamps 34 is reflected into the diffuser space to illuminate the diffuser 38. The light going through the window slots 29 is reflected from the reflecting surface 35 of the turned-down margins 37 of the side walls of the V-shaped lamp channel 27, the margins 37 being disposed at a selected small angle from the vertical to reflect the light which comes through the window slots 29 into the diffuser trough 38, either directly or by a second reflection from the outer wall surface of the side walls 28, depending upon the position of the window slots and the angular disposition of the reflecting surfaces. The diffuser 38 consists of a translucent formed synthetic plastic material trough whose edge margins 39 are turned down slightly to engage the inclined, in-turned hook flanges 36 of the turned-down margins 37 of the channel walls. The diffuser 38 is provided with an inwardly turned bottom rib 40 which serves to stiffen the structure in the longitudinal direction. The trough 38 is rigid but may be distorted laterally by hand pressure to insert or withdraw its margins 39 from the in-turned hook flanges 36 of the turned-down margins 37. Socket mounting members 30 of generally triangular shape are attached near the ends of the tube channels, said members 30 having turned margins 31 for attachment to the adjacent sides of the lamp channel 27, by means of screws 32. Each socket mounting member 30 is provided with a hole 33 arranged to receive the ends of the lamp sockets 45, the sockets being attached by means of brackets 44 held to the mounting members 30 by screws 43. The lower portion of the V-shaped lamp channel 27 is partitioned off horizontally by a longitudinally ridged cover 47 removably attached by screws 48 to the tabs 49 on the socket mounting members 30 to form an enclosed wire channel 51. The cover 47 is longitudinally ridged so that downwardly directed light from the adjacent lamp tube 34 will be reflected angularly from both angularly-disposed surfaces 52, and thus be added to the main light emission directed toward the ceiling. The electrical terminals of the lamp sockets 45 are connected by flexible conduits 53 to pin plug connectors 54. End plates 55 with holes for attachment screws are spot-welded at the ends of the trough.

The coupler-ballast-suspension unit consists generally of an unlighted structure having substantially the same outer cross-sectional shape and appearance as the light housing units, with an enclosed electrical ballast member, and with a spring-tensioned swiveling attachment means for a stem which is attachable at its upper end to a swivelled connector to an electrical outlet box in the ceiling. End plates 55 are spot-welded at the ends of the suspension units for attachment by bolts to the similar end pieces on the light unit.

In detail, the coupler-ballast-suspension unit 20 consists of a linear extruded metal support member 57 which is provided with a rigid horizontal plate 59 extending for the length of the unit 20 and across it at its upper middle elevation, being provided on its top surface with reinforcing ribs 60 and with side beads 61 extending upwardly from the margins of the plate 59, these beads having inside undercut grooves 62 for engaging the out-turned flanges 63 of the spring-tension swivel attachment means 64 for the stem 65. A longitudinal vertical screw slot 66 extending from end to end in each of the upstanding beads 61 from the top surface thereof provides means for fastening flanged angled side plates 68 (which correspond to the turned-down margins 37 of channel walls 28 of the fluorescent tube housing unit 16), there being inwardly directed hook flanges 69 on the lower edges thereof.

The plate 59 is also provided along its longitudinal center line with a screw head slot 70 which is enclosed by the integral screw head slot cover 71 on the under side of which is an angular rib 72 which is arranged to engage in the slot 73 of the screw head 74 of the screws 75, which support the ballast means 76 on the under side of the plate 59. The space above the plate 59 serves as a wireway carrying the electrical lead wires 77 and 78 from the stem to the ballast and to the pin connector socket 79 which connects electrically to the pin plug 54 leading to the sockets 45 for the lamps 34 in the adjacent lamp housing units 16. This wireway is enclosed on the top side by a sheet metal cover 82 held to the top surfaces of the beads 61 by screws 83, and by the holding tabs 84 pushed out from the box 85 of the attachment means 64.

A sheet metal spring-enclosing box 85 extends over the wireway midway of its length, the open face of the box being directed toward the wireway. The sides 86 of the box 85 are provided with out-turned flanges 63 which engage in the undercut grooves 62 in the beads 61. The top 88 of the box 85 is apertured as at 89 to receive the base 90 of the trunion member 91, the trunions 92 extending oppositely, and being engaged under the half round bearings 93 formed in the top surface 88 of the box 85. A threaded hole 94 is provided in the center of the trunion member 91, this threaded hole engaging the stem 65. A broad U-shaped plate spring 95 having a central aperture to permit passage therethrough of the electric lead wires 77 and 78 from the stem 65 presses upwardly against the trunion base 90, the legs 96 of the spring 95 being bent outwardly at their ends to engage notches 97 in the side walls 86. The stem 65 may thus be positioned under spring tension at any angle from the vertical in any compass position. A snap-on cover plate 96, in cross-section corresponding to the cross-section of the diffuser 38, may be engaged in the hook flanges 69 of the angled side plates 68. The cover plate 96 may be of molded plastic material, or of any suitably shaped sheet material such as metal.

The stem 65 is mechanically and electrically attached to ceiling outlet boxes. The mechanical attachment is preferably a ball and socket type connection which permits some freedom for the entire assembly to swing. I prefer to use a swivel connection described in detail in Bodian co-pending patent application, Serial No. 634,038 filed January 14, 1957, now Patent No. 2,851,588, issued September 9, 1958, in which the upper end of the stem is threadedly attached to the ball 116 which is angularly movable in a cage or socket 115 which is removably attached to a base plate 104, as shown in FIG. 4.

The base plate 104 for the swivel connection is adapted to be supported on an electric wiring outlet box 105 by means of screws 106 in the threaded ears 107 which are generally provided on the open face of the outlet box. The base plate 104 is provided with a central raised boss 108 having an opening 109 for electrical wires and diametrically opposed raised tab pockets 110 with adjoining openings 111 disposed away from the central circular raised boss 108, the pockets 110 being adapted to receive out-turned tabs 112 on the socket frame 113. A wedge tab 114 extends into each of the pockets 110 from the inner edge of the base plate pocket, for the safety locking of the out-turned tabs 112, as will be described.

The socket frame 113 consists of a generally cylindrical body, one end of which is drawn in to form a part-spherical socket 115 which is adapted to hold a ball 116. Upper portions of the cylindrical body 117 are cut away in opposite segments to leave opposed legs 118 extending from the upper rim of the socket 115. The legs 118 are curved in cross-section and disposed apart to fit around the raised boss 108 on the base plate 104; and each leg at its end is provided with an out-turned tab 112 which is adapted to engage the tab pocket 110 of the base plate. The circular raised boss 108 serves as an abutment for the legs and as a guide in turning the tabs into the pockets. A raised abutting boss is provided on the outer face of each of the tabs 112, these bosses being adapted to engage wedge tabs 114 extending into the tab pockets 110 from the base plate 104 adjacent the inner edge of the tab pockets 110. Each leg 118 is also provided, at positions intermediate the out-turned tabs 112 and the socket, with radial tabs 120 which are adapted to coact with parts of the canopy, as later described.

On the outer surface of each of the legs 118 adjacent the out-turned tabs 112 there is provided a spring detent clip 122 which is arranged to releasably engage the notches in the edge of the tab pockets 110 contiguous to the boss 108 on the base plate. The socket frame 113 is removably attached to the base plate 104 by rotating the frame around the boss 108 so that the out-turned tabs 112 enter the tab pockets 110 to the bottom of the pockets, at which position the spring detents 122 engage the legs 118 and simultaneously the wedge tabs 114 press against the abutting bosses on the out-turned tabs 112, thus securely locking the socket frame 113 to the base plate 104 so that it cannot be loosened by vibration or by a laterally applied force. The socket frame 113 may, by reversing the rotation and simultaneously releasing the spring detents 122 by grasping them with the fingers, be removed without the employment of any tools.

The canopy 121 consists of a hollow metal stamping having a central opening 124 adapted to fit around the lower end of the socket 115. Inside the canopy there is provided a pair of diametrically opposed helical tracks 125 formed from sheet metal on a cylindrical body having attachement tabs 126 which are spot-welded to the inside surface of the canopy. The helical tracks 125 are adapted to engage radial tabs 120 on the legs 118 of the socket frame 113, as previously described. When the canopy is rotated with the helical tracks 125, engaging the radial tabs 120, the rim of the canopy is raised to tightly press against the outer rim of the base plate 104 (or against the ceiling surface), and thus conceals all of the hanger device except the pendant stem 65 and the lower portion of the ball 116.

Figure 2:
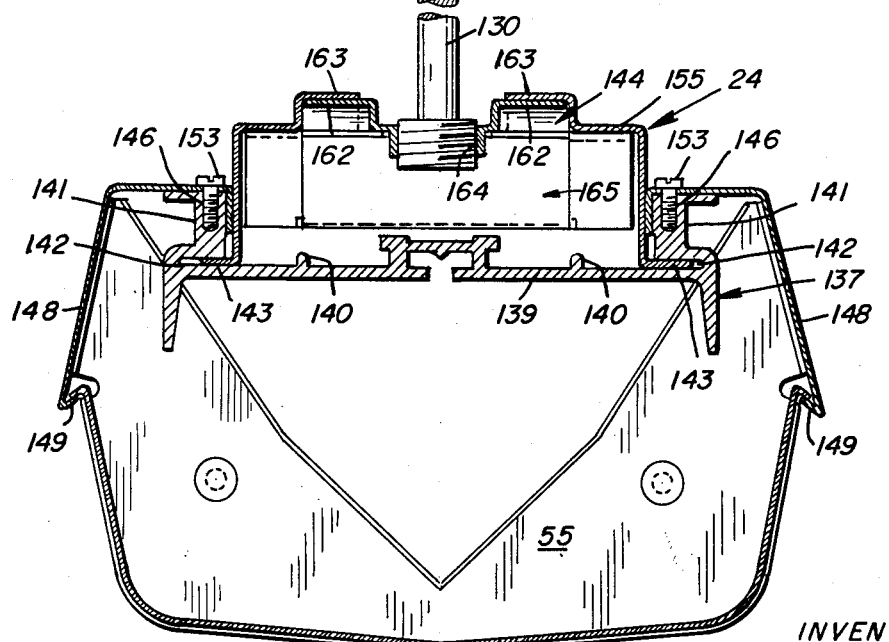
FIG. 2 is a cross-sectional view taken on the line 2—2 of FIG. 1.
Figure 5:
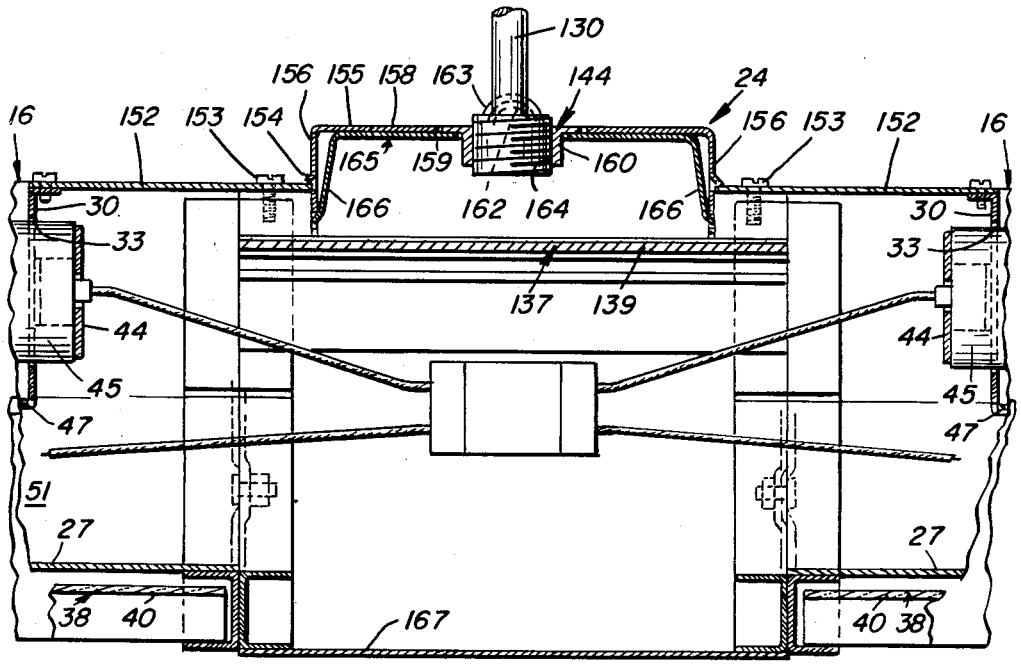
FIG. 5 is a vertical longitudinal cross-sectional view taken on the line 5—5 of FIG. 1.
Figure 7:
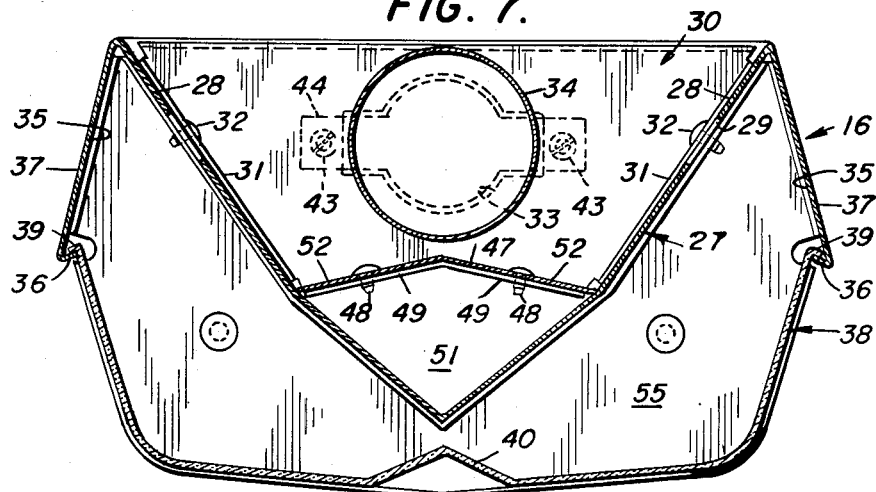
FIG. 7 is a cross-sectional view taken on the line 7—7 of FIG. 1 of a typical fluorescent tube housing unit.

The coupler-suspension units 24 are somewhat similar to the coupler-ballast-suspension units being generally shorter in length since they do not enclose ballast elements. End plates 55 are also provided for making abutting connection with the end plates of the light units. Referring particularly to FIGS. 2 and 5, a coupler-suspension unit 24 consists of a linear extruded metal support member 137 extending for the length of the unit 24 and across it at its upper middle elevation, being provided on its top surface with reinforcing ribs 140 and with side beads 141 extending upwardly from the margins of the plate 139, these beads having inside undercut grooves 142 for engaging the out-turned flanges 142 of the spring-tensioned attachment means 144 for the hanger rod 130. A longitudinal vertical screw slot 146 extending from end to end in each of the upstanding beads 141 from the top surface thereof provides means for fastening flanged angled side plates 148, there being inwardly directed hook flanges 149 on the lower edges thereof. A sheet metal cover 152 is held to the top surfaces of the beads 141 by screws 153, and by holding tabs 154 pushed out from the box 155 which encloses the spring tensioning attachment means 144 for the rod 130.

A sheet metal spring-enclosing box 155 extends over the plate 139 midway of its length, the open face of the box being directed toward the plate. The sides 156 of the box 155 are provided with out-turned tabs 154 which engage the cover 152. The top 158 of the box 155 is apertured as at 159 to receive the base 160 of the trunnion member 161, the trunnions 162 extending oppositely, and being engaged under the half-round bearings 163 formed in the top surface 158 of the box 155. A threaded hole 164 is provided in the center of the trunion member 161, this threaded hole engaging the rod 130. A broad U-shaped plate spring 165 presses upwardly against the trunion base 160, the legs 166 of the spring 165 being bent outwardly at their ends to engage notches in walls 156. The rod 130 may thus be positioned under spring tension at any angle from the vertical in any compass position. A snap-on cover plate 167, in cross-section corresponding to the cross-section of the diffuser 38, may be engaged in the hook flanges 149 of the angled side plates 148. The snap-on cover plate 167 may be of molded plastic material, or of any suitably shaped sheet material, such as metal. The cavity in the coupler-suspension unit 24 serves to hold the pin socket connectors of the adjoining lamp housing units 16.

The hanger rod 130 is provided at its upper end with a hook 131 which is adapted to engage an eyelet 132 mounted in the ceiling from which the fixture is suspended.

The advantages of my invention will be obvious from the above description. The assembly of units is made piece-by-piece from the previously wired light housing units and coupler-ballast-suspension units. In general, the coupler-ballast-suspension units are first operatively mounted to the ceiling where outlet boxes are provided, and the electrical connections from the outlet boxes are made to the leads in the support tube. The other units are then attached to the coupler units, and the electrical connections being made by the connectors at each end of the several units.

While I have described one particular arrangement for the long light fixture assembly, it will be clear that many mondifications of this pattern may be assembled from the units in an analogous manner.

The objectives previously set forth are accomplished by my invention as described.

I claim:

1. A long single-line assembly of tubular fluorescent light fixtures for suspension rod ceiling mounting comprising pluralities of upwardly directed trough-like fluorescent tube housing units each partly enclosing elongated fluorescent light tubes; coupler-suspension-ballast units each comprising an open-face housing containing ballast elements and each having end plates at its opposite ends, and having a ceiling suspension rod attached intermediate said end plates; and coupler-suspension units each having end plates at its opposite ends, and having a ceiling suspension rod attached intermediate said end plates; each fluorescent tube housing unit being removably connected at one end to a coupler-suspension-ballast unit, and at the other end to a coupler-suspension unit, said units being interconnected electrically by electrical conductors, and mechanically by bolt means connecting abutting end members to form a long single row of fluorescent tube lights interrupted alternately by unlighted coupler-suspension-ballast units and unlighted coupler-suspension units; each of said fluorescent tube units comprising a trough-like structure partly surrounding the tubular lights, with end plates at the end of said troughs, said troughs being provided adjacent the ends with sockets for mounting the tubular fluorescent lamps, and electrical leads from said sockets connected to pin plug electrical connectors, said pin plug connectors being separably connected to pin socket connectors from said ballast elements; each of said coupler-suspension-ballast units comprising a suspension plate, one of said ballast element suspended from said plate, a spring-tensioned swing connection attached to the upper face of said plate and to a suspension rod whereby the assembly may be non-rigidly suspended from the ceiling and may swing in any direction with retardation by said spring tensioned means, electrical leads from said ballast elements connected to said pin connector sockets; and removably attached cover means for the open face of said coupler-suspension-ballast unit, said cover means concealing said electrical connectors.

2. A long single-line assembly of tubular fluorescent light fixtures for suspension rod ceiling mounting comprising pluralities of upwardly directed trough-like fluorescent tube housing units each partly enclosing elongated fluorescent light tubes; coupler-suspension-ballast units each comprising an open faced housing containing ballast elements and each having end plates at its opposite end, and having a ceiling suspension rod attached intermediate said end plates; and coupler-suspension units each having end plates at its opposite ends, and having a ceiling suspension rod attached intermediate said end plates; each fluorescent tube housing unit being removably connected at one end to a coupler-suspension-ballast unit, and at the other end to a coupler-suspension unit, said units being interconnected electrically by electrical conductors, and mechanically by bolt means connecting abutting end members to form a long single row of fluorescent tube lights interrupted alternately by unlighted coupler-suspension-ballast units and unlighted coupler-suspension units; each of said fluorescent tube housing units comprising a trough-like structure partly surrounding the tubular lights, with end plates at the end of said troughs, said troughs being provided adjacent the ends with sockets for mounting the tubular fluorescent lamps, and electrical leads from said sockets connected to pin plug electrical connectors, said pin plug connectors being separably connected to pin socket connectors from said ballast elements; each of said coupler-suspension-ballast units comprising a suspension plate, one of said ballast elements suspended from said plate, a spring-tensioned swing connection attached to the upper face of said plate and to a suspension rod whereby the assembly may be non-rigidly suspended from the ceiling and may swing in any direction with retardation by said spring-tensioned means, electrical leads from said ballast elements connected to said pin connector sockets and removably attached cover means for the open face of said coupler-suspension-ballast members, said cover means concealing said electrical connectors; and each of said coupler-suspension units comprising a top plate, a spring-tensioned swing connection attached to the upper face of said plate, adapted for attachment to the ceiling; and removably attached cover means concealing the electrical connections between said fluorescent tube housing units attached to said coupler-suspension unit.

References Cited in the file of this patent
UNITED STATES PATENTS

| | | |
|---|---|---|
| 2,288,941 | Curtis | July 7, 1942 |
| 2,543,713 | Yeager | Feb. 27, 1951 |
| 2,569,518 | Deutsch et al. | Oct. 2, 1951 |
| 2,739,780 | Richards | Mar. 27, 1956 |
| 2,753,445 | Thomas et al. | July 3, 1956 |
| 2,818,497 | Alden | Dec. 31, 1957 |
| 2,932,728 | Thomas | Apr. 12, 1960 |